United States Patent [19]

Molnar

[11] 4,305,618

[45] Dec. 15, 1981

[54] VEHICLE SAFETY BELT WITH RETRACTOR LOCK DEVICE

[75] Inventor: John Molnar, Aurora, Ill.

[73] Assignee: Caterpillar Tractor Co., Peoria, Ill.

[21] Appl. No.: 117,583

[22] PCT Filed: Dec. 18, 1979

[86] PCT No.: PCT/US79/01125

§ 371 Date: Dec. 18, 1979

§ 102(e) Date: Dec. 18, 1979

[87] PCT Pub. No.: WO81/01661

PCT Pub. Date: Jun. 25, 1981

[51] Int. Cl.³ .............................................. A62B 35/02
[52] U.S. Cl. .................................. 297/476; 24/230 R; 70/233; 242/107.4 R; 297/474; 297/479
[58] Field of Search ............... 297/476, 475, 474, 479; 242/107.4 R; 70/233; 280/807, 804; 24/230 R, 230 AK; 188/82.3

[56] References Cited

U.S. PATENT DOCUMENTS

| | | | |
|---|---|---|---|
| 3,248,148 | 4/1966 | Board et al. | 242/107.4 |
| 3,294,447 | 12/1966 | Riley | 297/476 |
| 3,319,998 | 5/1967 | Boland | 297/476 |
| 3,323,832 | 6/1967 | Kirkpatrick | 297/476 |
| 3,891,273 | 6/1975 | Takada | 242/107.4 R |
| 4,033,160 | 7/1977 | Mima | 70/233 |
| 4,219,236 | 8/1980 | Takada | 297/476 |

FOREIGN PATENT DOCUMENTS 322425  4/1970  Sweden ............................... 297/476

Primary Examiner—James T. McCall
Attorney, Agent, or Firm—Wegner, Stellman, McCord, Wiles & Wood

[57] ABSTRACT

A vehicle safety belt system with a retractor lock device which includes a retractor (40), a belt (50) terminating in a male buckle member (52), a female buckle member (60), and a retractor lock device (20). The retractor lock device (20) includes a lock member (30), a base member (21) having an anchor bolt (22) attached thereto, a spring (23) and a guide bolt (24). The lock member (30) is movable between a disengaged position and an engaged position, the spring (23) normally urging the lock member (30) into the disengaged position. When the male buckle member is inserted into the female buckle member, it moves the lock member (30) into engagement with the retractor (40), thereby preventing rotation of the retractor.

8 Claims, 6 Drawing Figures

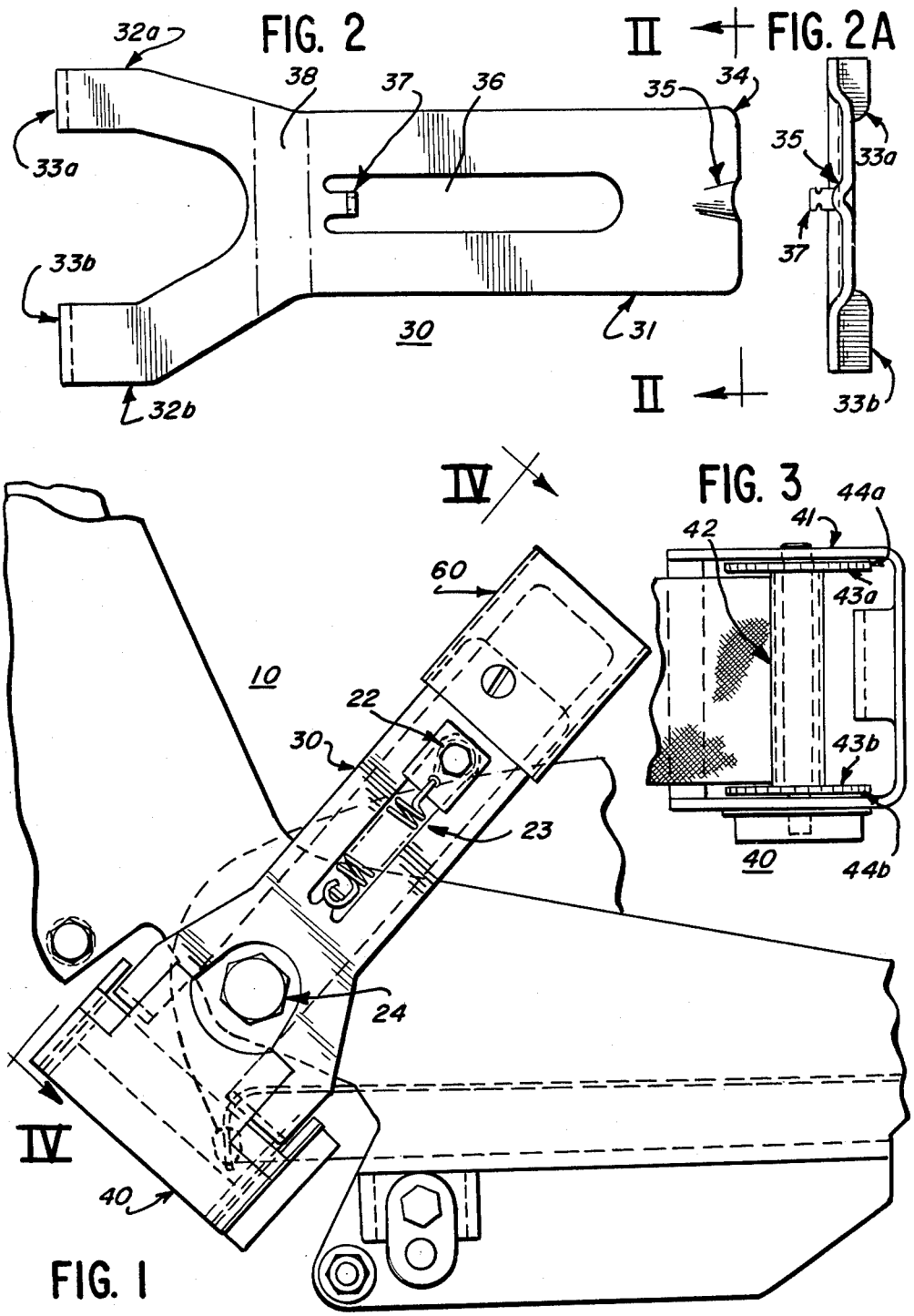

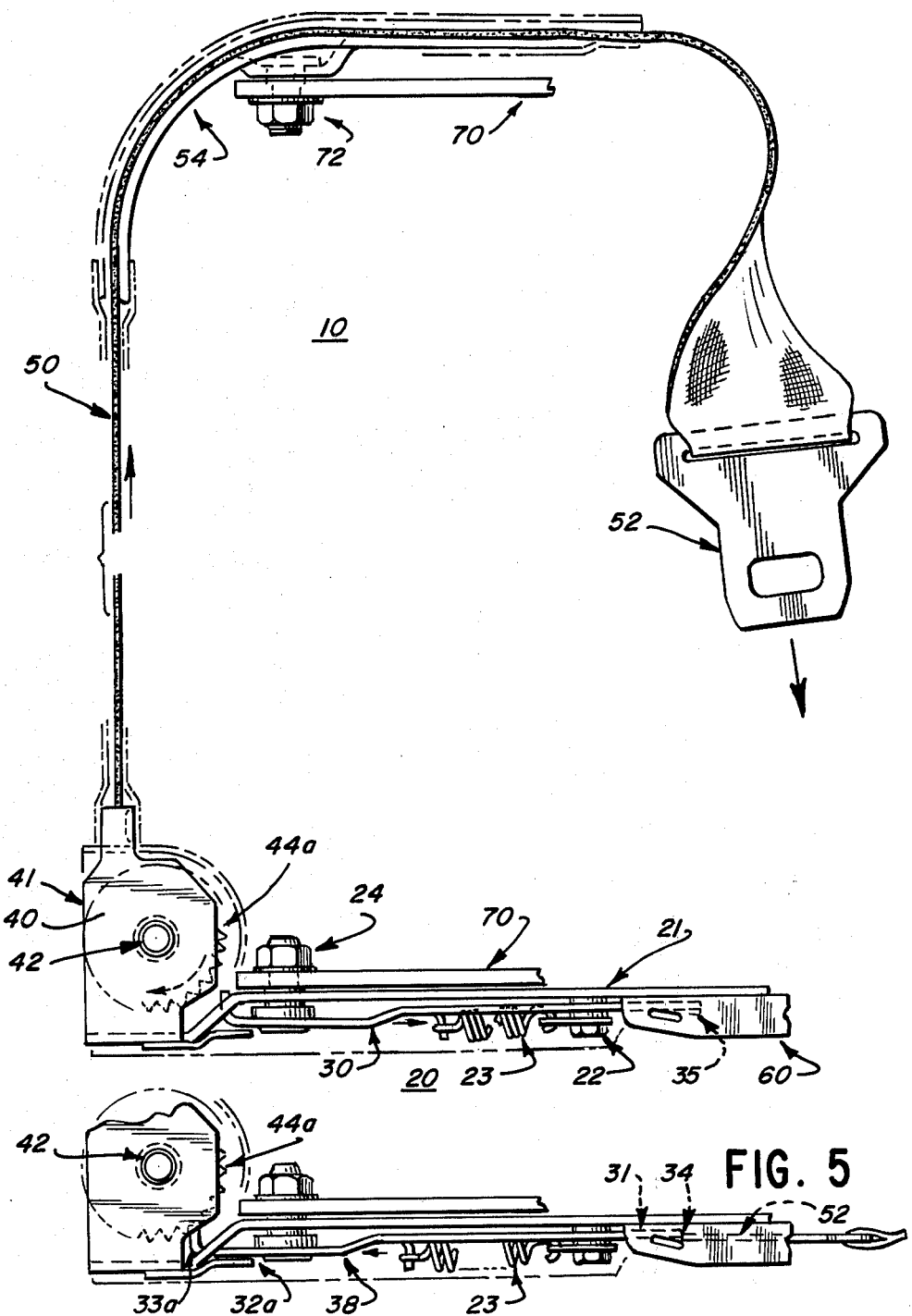

VEHICLE SAFETY BELT WITH RETRACTOR LOCK DEVICE

TECHNICAL FIELD

This invention relates to a retractor lock device for preventing "cinch-up" of a seat belt system having a retracting means.

BACKGROUND ART

Seat belt systems exist in a wide variety of forms, the most common being that of a continuous belt retractor system. In this system, the belt is wound on a retracting shaft inserted in a housing, is unwound to lie across a user's lap, and has a male buckle member inserted in a female buckle member. A spring bias is provided in a retractor base so as to exert a back pressure on the belt to take up any slack and hold the user firmly on the seat. A toothed retractor gear (often referred to as a ratchet wheel) in combination with a pawl is provided with the retractor shaft to prevent further unrolling of the belt once the slack has been taken up.

Although the seat belt systems are effective in restricting passenger movement in a collision, often problems are encountered when the vehicle is operated over rough terrain. When these safety belt systems are used in off-road vehicles such as tractors and earthmoving equipment, a condition known as "cinch-up" can occur. As the vehicle is driven over rough terrain, the driver will be forced down into his seat thereby causing slack in the belt. This excess slack will be taken up by the retractor mechanism and the retractor ratchet wheel and pawl will prevent further extension of the belt thereby causing the belt to tighten about the driver. Such tightening may cause discomfort and impair the driving ability of the operator.

It is desirable to provide a retractor lock mechanism for use with the safety belt system. The incorporation of such a device in a safety belt system prevents "cinch-up" by locking the retractor in position, thereby preventing take-up of the belt.

The only safety belt mechanism known to applicants which includes means for preventing "cinch-up" is that of Boland U.S. Pat. No. 3,319,998.

DISCLOSURE OF INVENTION

The present invention is directed to overcoming the problems as set forth above.

According to the present invention, a retractor lock device for use with a safety belt system has a lock member movable between a disengaged position and an engaged position. The lock member is spring biased to the disengaged position; and insertion of the male buckle member on the end of the seat belt into the female buckle member moves the lock member into engagement with a toothed retractor wheel to prevent rotation thereof in either direction.

BRIEF DESCRIPTION OF DRAWINGS

FIG. 1 is a side elevational view of the retractor and female buckle member of a seat belt system incorporating the retractor lock device of the present invention, showing a part of the vehicle seat;

FIG. 2 is a top plan view of the retractor lock member;

FIG. 2A is an end elevational view of the retractor lock member viewed from the line II—II of FIG. 2;

FIG. 3 is a fragmentary sectional view of the retractor mechanism;

FIG. 4 is a plan view of the seat belt system of the present invention, taken substantially as indicated along the line IV—IV of FIG. 1, with the seat omitted, and with the lock member disengaged; and FIG. 5 is a fragmentary view like FIG. 4 with the male and female buckle members engaged and the lock member engaged.

BEST MODE FOR CARRYING OUT THE INVENTION

Referring to FIGS. 1 and 4 of the drawings, a seat belt system is generally indicated by the reference numeral 10. The seat belt system includes a retractor lock device 20, a retractor 40, a belt 50 terminating in a male buckle member 52, a belt guide 54 and a female buckle member 60 having spring loaded latch means (not shown) which engages the male buckle member 52 in the usual way. The retractor lock device 20 has a base member 21 having an anchor bolt 22 attached thereto, a spring 23, a guide bolt 24, and a lock member 30.

Referring to FIG. 2 and FIG. 2A, the lock member 30 is shown as generally being of Y-shaped construction, and has an abutment member 31 and bifurcated retractor engaging members 32a and 32b. The abutment member 31 has an abutment end 34, a raised portion 35, a guide slot 36, a spring post 37, and an inclined surface 38. The two retractor engaging members 32a and 32b each have retractor engaging ends 33a and 33b respectively.

Referring to FIGS. 3 and 4, the retractor 40 includes a housing 41, a retractor shaft 42, and two toothed wheels 43a and 43b attached to the ends of the retractor shaft 42. The toothed wheels 43a and 43b have a plurality of teeth 44a and 44b respectively disposed about their periphery.

Referring to FIGS. 1 and 4, the female buckle member 60 is attached to the base member 21, which in turn is attached to the retractor 40 and to a seat base 70 by the guide bolt 24. The lock member 30 is positioned over the base member 21 so that the abutment member 31 is within the female buckle member 60 and the retractor engaging members 32a and 32b are positioned on either side of the guide bolt 24. With the lock member 30 disposed in this manner, the anchor bolt 22 is positioned within the guide slot 36. The spring 23 is attached to the spring post 37 of the lock member 30 and to the anchor bolt 22 of the base member 21.

The retractor shaft 42 and toothed wheels 43 are mounted within the housing 41 so as to permit rotation. The retractor shaft 42 is spring-loaded (not shown) and the belt 50 is wound about it. The belt guide 54 is attached to the seat base 70 by a bolt 72 and acts to guide the belt 50 around the passenger.

INDUSTRIAL APPLICABILITY

In operation, when the seat belt system 10 is not in use as shown in FIG. 4, spring 23 acts to force the lock member 30 into a disengaged position, whereby the retractor engaging ends 33a and 33b are spaced from the teeth 44a and 44b of the toothed retractor wheels 43a and 43b. This allows retractor shaft 42 to rotate freely within retractor 40.

As the male buckle member 52 and the belt 50 are extended from the retractor 40, the retractor shaft 42 and the toothed wheels 43a and 43b turn against the biasing force of the retractor spring (not shown). As the male buckle member 52 is inserted into the female buckle member 60, as shown in FIG. 5, the end of the male buckle member 52 contacts the enlarged surface consisting of the abutment end 34 and the raised portion 35 of the lock member 30, thereby forcing the lock member 30 toward the engaged position against the biasing force of the spring 23. The lock member 30 assumes the engaged position when the male buckle member 52 is latched into the female buckle member 60. When the lock member 30 is in the engaged position, the retractor engaging ends 33a and 33b of the lock member 30 contact the teeth 44a and 44b, respectively, of the retractor 40, as seen in FIG. 5, thereby preventing further rotation of the retractor shaft 42 in either direction. The guide bolt 24, the guide slot 36, the anchor bolt 22, and the inclined surface 38 operate to align the lock member 30 for proper contacting of the teeth 44a and 44b. When the lock member 30 is in the engaged position, slack in the belt 50 is not taken up by the retractor 40 due to the prevention of retractor shaft rotation by the engaging of the teeth 44a and 44b by the lock member 30.

As the male buckle member 52 is unlatched and removed from the female buckle member 60, the spring 23 acts to move the lock member 30 to the disengaged position thereby allowing rotation of the retractor shaft 42 to take up the belt 50.

Other aspects, objects and advantages of this invention can be obtained from a study of the drawings, the disclosure and the appended claims.

I claim:

1. In a safety belt system (10) having a belt (50) terminating in a male buckle member (52) which engages a female buckle member (60), and retractor means (40) including a rotatable shaft (42) for winding up the belt (50) when the buckle members are disengaged, a retractor lock device (20) comprising, in combination:
   a base member (21) fixedly supporting the female buckle member (60) and the retractor means (40);
   a lock member (30) having an abutment end (31) in the female buckle member (60) and a retractor engaging end (32), said lock member (30) being mounted on the base member (21) for movement between a disengaged position and an engaged position;
   and spring means (23) normally urging the lock member (30) to the disengaged position, insertion of the male buckle member (52) into the female buckle member (60) acting on the lock member (30) to move it to engaged position in which its retractor engaging end (32) locks the retractor means (40) against rotation in either direction.

2. The safety belt system of claim 1 which includes means (22) for mounting said lock member on said base for sliding movement between said disengaged position and said engaged position.

3. The safety belt system of claim 2, wherein said retractor engaging end (32) of the lock member (30) is of bifurcated construction (32a,32b).

4. The safety belt system of claim 3, wherein said lock member abutment end (31) has an enlarged surface (34,35) for contacting said male buckle member (52).

5. The safety belt system of claim 1, wherein said retractor engaging end (32) of said lock member (30) is of bifurcated construction (32a,32b).

6. The safety belt system of claim 1, wherein said lock member abutment end (31) has an enlarged surface (34,35) for contacting said male buckle member (52).

7. In a safety belt system (10) having a belt (50) terminating in a male buckle member (52) which engages a female buckle member (60), and retractor means (40) including a rotatable shaft (42) for winding up the belt (50) when the buckle members are disengaged, a retractor lock device (20) comprising in combination:
   a base member (21) fixedly supporting the female buckle member (60) and the retractor means (40);
   a wheel (43a or 43b) on the retractor shaft (42), said wheel having peripheral teeth (44a or 44b);
   a lock member (30) having an abutment end (31) in the female buckle member (60) and a retractor engaging end (32), said lock member (30) being mounted on the base member (21) for movement between a disengaged position and an engaged position;
   and spring means (23) normally urging the lock member (30) to the disengaged position, insertion of the male buckle member (52) into the female buckle member (60) acting on the lock member (30) to move it to engaged position in which its retractor engaging end (32) is seated between two adjacent teeth (44a or 44b) of the wheel (43a or 43b) to lock the retractor means (40) against rotation in either direction.

8. The safety belt system of claim 7 in which there are wheels (43a and 43b) on opposite ends of the rotatable retractor shaft (42) and said wheels have respective teeth (44a and 44b), and in which the retractor engaging end (32) of the lock member (30) is of bifurcated construction (32a,32b) so as to engage the teeth (44a and 44b) of both the wheels (43a and 43b).

* * * * *